United States Patent

Hamada et al.

[11] Patent Number: 5,670,259
[45] Date of Patent: Sep. 23, 1997

[54] WATER SOLUBLE PYROLYTIC PAINT

[75] Inventors: Yoshitaka Hamada, Kawasaki; Yo Kameyama, Tokyo, both of Japan

[73] Assignee: Heat System Research & Industry, Inc., Tokyo, Japan

[21] Appl. No.: 581,202

[22] Filed: Dec. 29, 1995

[51] Int. Cl.$^6$ ............................ C09D 1/02; C09D 5/00; C09D 5/26
[52] U.S. Cl. .................. 428/450; 428/446; 428/457; 428/461; 106/623; 106/628; 106/634; 106/635; 106/287.26; 252/512; 252/513; 252/515; 252/516; 252/518; 252/520; 252/521
[58] Field of Search .................... 106/623, 628, 106/634, 635, 600, 286.2, 286.4, 286.5, 287.26; 428/450, 446, 457, 447, 461; 252/500, 512, 513, 515, 516, 520, 521, 518

[56] References Cited

U.S. PATENT DOCUMENTS

| | | |
|---|---|---|
| 3,404,031 | 10/1968 | Clayton et al. |
| 3,770,613 | 11/1973 | Chisholm ............... 204/290 R |
| 3,959,063 | 5/1976 | Hawthorne ............... 106/623 |
| 4,469,721 | 9/1984 | Shioya . |
| 5,310,422 | 5/1994 | Abdel-Latif ............... 106/635 |
| 5,518,535 | 5/1996 | Boaz ............... 106/635 |
| 5,527,442 | 6/1996 | Sekhar et al. ............... 204/290 R |

FOREIGN PATENT DOCUMENTS

| | | |
|---|---|---|
| 0295834 | 12/1988 | European Pat. Off. . |
| 0514557 | 11/1992 | European Pat. Off. . |
| 0525808 | 2/1993 | European Pat. Off. . |
| 49-28695 | 7/1974 | Japan . |
| 54-37707 | 11/1979 | Japan . |

*Primary Examiner*—Michael Marcheschi
*Attorney, Agent, or Firm*—Birch, Stewart, Kolasch & Birch, LLP

[57] ABSTRACT

The present invention provides a water soluble, inorganic pyrolytic paint which, when dried to form a paint layer, generates heat from a whole surface of the paint layer by supplying electric current therethrough. The pyrolytic paint is prepared by mixing and stirring together a mixture of metal carbide, metal oxide, metal nitride, metal boride and metal silicide, additive metal and a solvent containing sodium citrate, ethylene glycol, silicic acid anhydride and/or sodium silicate and water. When painted on a substrate surface and dried, the silicon dioxide component thereof forms insoluble macromolecular lands "L" by the condensation reaction of silanol base, which form a stable paint layer, and metal particles M thereof bridge the lands L and are supported thereby to provide uniform electric resistance throughout a surface of the paint layer, so that the paint layer can generate heat uniformly throughout the paint layer when electric current is supplied therethrough.

8 Claims, 1 Drawing Sheet

WATER SOLUBLE PYROLYTIC PAINT

TECHNICAL FIELD

The present invention relates to a pyrolytic paint which paints a substrate and generates heat by a current flowing therethrough.

BACKGROUND ART

Japanese Patent Publication Nos. S49-28695 and S54-37707 propose pyrolytic paints which are organic, water soluble, electrically conductive paints consisting of ionomer resin or its water emulsion containing electrically conductive carbon black.

Since, however, these paints employ organic materials, they can be utilized only at a low temperature of 100° C. or lower and can not be utilized to generate heat at a middle temperature from 200° C. to 400° C. or higher.

An object of the present invention is to provide a water soluble inorganic pyrolytic paint capable of generating heat to a low temperature as well as middle temperature or higher.

Another object of the present invention is to provide a water soluble pyrolytic paint capable of painting various substrates such as ceramics, metal, wood and paper, etc., by suitable means including printing means such as gravure printing, screen printing or painting means such as spray painting, immersion painting.

SUMMARY OF THE INVENTION

A water soluble pyrolytic paint according to the present invention is formed by adding a solvent consisting of sodium citrate, ethylene glycol, silicic acid anhydride and/or sodium silicate and water to a mixture of metal carbide, metal oxide, metal nitride, metal boride and metal silicide and/or an additive metal and agitating them.

The water soluble pyrolytic paint according to the present invention can be regulated such that a coating layer of the paint contains 15–45 wt % metal carbide, 3–15 wt % metal oxide, 0.5–5 wt % metal nitride, 10–30 w % metal boride, 0.5–25 wt % metal cilicide, 10–25 wt % additive metal, 2–3 wt % sodium citrate, 2–2.5 wt % ethylene glycol and 5–10 wt % silicic acid anhydride and/or sodium silicate.

Further, the water soluble pyrolytic paint according to the present invention can be used as a heat generator for heating to a low and middle temperature or a high temperature by changing percentage of the respective constituents of the mixture contained in the coating layer.

The water soluble pyrolytic paint according to the present invention becomes a liquid having desired viscosity and desired thixotropy by mixing the mixture containing metal components with the solvent and agitating them. In such case, the various metals in the mixture form a kind of metal complex together with sodium citrate and ethylene glycol. On the other hand, the silanol base of the silicon dioxide contained in the mixture and the solvent are sequentially dehydrated and condensed when the paint on a desired, electrically non-conductive substrate is dried and the metal particles are fixed to a surface of the substrate.

This phenomenon can be considered as being similar to random adhesion of sodium ions, hydroxyl group ions and water to siloxanesilanol surface, as shown by the following chemical formula:

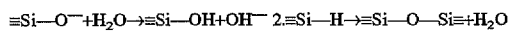

As illustrated in FIG. 1, the silicon dioxide component forms a stable paint layer in the form of non-soluble lands L of macromolecules resulting from the condensation reaction of silanol base on a surface S of the substrate, which may be of ceramics, metal, wood or paper. The paint layer is strongly and reliably adhered to the surface S even when the latter is flat and smooth.

An outer appearance of the paint layer thus formed, dehydrated and condensed depends upon the configuration of various metal particles M, particle sizes and contents thereof and the various metal particles M that bridge between the lands L. However, for the paint layer as the whole, the various metal particles M bridge the lands L in a dispersed form. This is realized by forming complexes in the step of stirring the metal mixture in a powder form, adding silicon dioxide and water to the stirred metal mixture and sufficiently mixing and agitating them.

The metal particles bridging the lands L and thus supported by the lands L have a uniform electrical resistance throughout the paint layer and generate heat when an Electric current flows therethrough. Temperature of the paint layer resulting from the heat generation depends upon constituents of the metal particle, their ratios and their configuration and densities, etc.

In another example of the water soluble pyrolytic paint according to the present invention, the dehydrated paint layer is further painted by a reinforcing paint of perhydropolysilazane or the like. With such reinforcing paint layer, glass particles G fill spaces between the lands L of the paint layer as illustrated in FIG. 2 to fix the metal particles M to the surface S of the substrate more strongly to thereby improve layer strength as well as thermal stability, electrical insulation and chemical resistance of the paint layer.

Further, the water soluble pyrolytic paint and the reinforcing paint can be heat-cured at a relatively low temperature to enhance dehydration and condensation thereof.

The transforming scheme by means of the reinforcing layer of perhydropolysilazane in air is formed by a glass film, that is, a ceramic film containing silicon dioxide as shown by the following chemical formula:

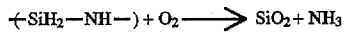

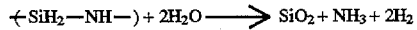

DETAILED DESCRIPTION OF THE PREFERRED EMBODIMENTS

Pyrolytic paints 1 to 4 having different constituents were prepared by mixing solvents containing sodium citrate, ethylene glycol, sodium silicate and water at different mixing rates with mixtures of titanium carbide, titanium oxide, aluminum nitride, chromium boride, molybdenum disilicide, tungsten and nickel at different mixing rates and stirring them. Test samples of the pyrolytic paints 1 to 4 were painted on surfaces of composite mica plates (100 mm×100 mm×1.0 mm) composed of natural mica and silicon and dried at 120° C.±6° C. such that the paints are heat-cured at a relatively low temperature, resulting in paint layers having thickness of 30 to 50 µm. The constituents of these paint layers were as shown in Table 1 below:

TABLE 1

| Constituent of paint | Paint No. 1 | No. 2 | No. 3 | No. 4 |
| --- | --- | --- | --- | --- |
| titanium carbide | 16 wt % | 24 wt % | 34 wt % | 43 wt % |
| titanium oxide | 10 wt % | 7 wt % | 5 wt % | 3 wt % |
| aluminum nitride | 4 wt % | 3.5 wt % | 0.8 wt % | 0.5 wt % |
| chromium boride | 15 wt % | 17 wt % | 22 wt % | 20 wt % |
| molybdenum disilicate | 21 wt % | 18 wt % | 7 wt % | 1 wt % |
| tungsten | 9 wt % | 10 wt % | 6 wt % | 6 wt % |
| nickel | 5 wt % | 9 wt % | 12 wt % | 11 wt % |
| sodium citrate | 3 wt % | 2 wt % | 3 wt % | 2 wt % |
| ethylene glycol | 2 wt % | 2.5 wt % | 2 wt % | 2 wt % |
| sodium silicate | 10 wt % | 6 wt % | 5 wt % | 9 wt % |
| water | remnant | remnant | remnant | remnant |

Figure 1:
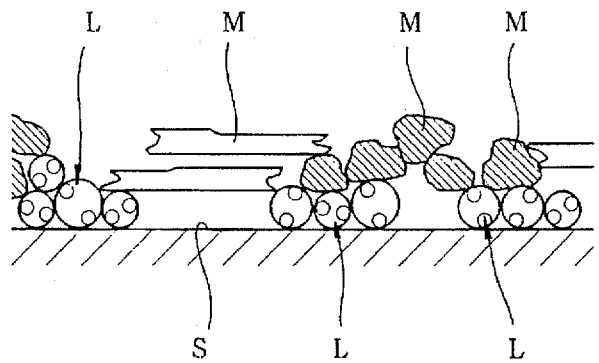
FIG. 1 illustrates a structure of a paint layer formed by a pyrolytic paint according to the present invention.
Figure 2:
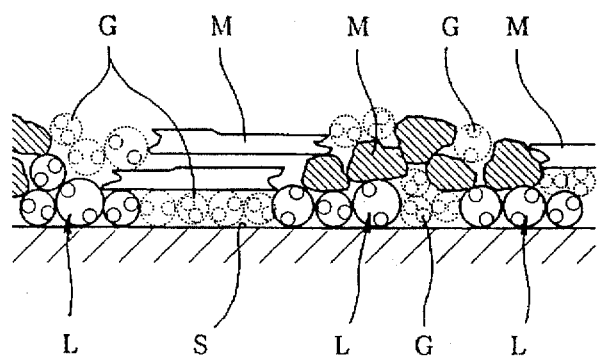
FIG. 2 illustrates a structure of the paint layer shown in FIG. 1 with a reinforcing paint layer.
Figure 3:
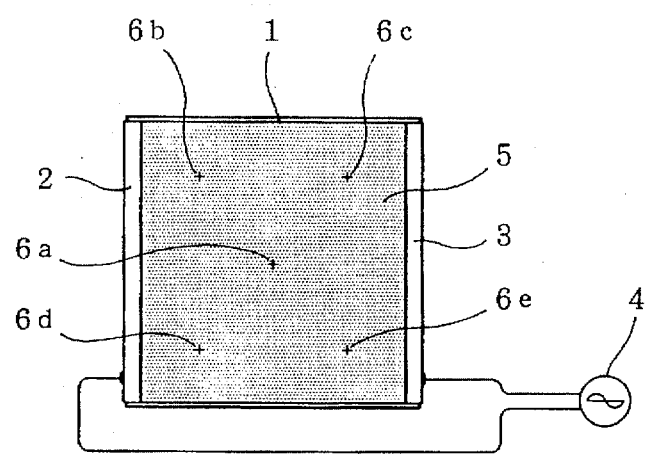
FIG. 3 is a front view of a test sample used in experiments of the present invention.

Each mica plate 1 was provided with electrodes 2 and 3 each 5 mm wide on opposite sides thereof and a power source 4 (DC 12V, 3A: AC 50V, 3A: AC100V, 3A) was connected between the electrodes as shown in FIG. 3. Surface temperature was measured at a center point 6a and four points 6b to 6e located at 20 mm from an upper and lower edge of the plate and 25 mm from the left and right sides of the plate by using temperature measuring probes. Paint layers are represented by item number 5 in FIG. 3.

Table 2 shows maximum temperature and current supply time during which temperature of the paint layer on each plate increases from room temperature to the maximum temperature Tmax (° C.).

From this, it has been found that the temperature increase of each paint layer with respect to current supply time t (sec) varies in series or linearly. Further, it has been found that temperature at the measuring points increases substantially simultaneously with difference in maximum temperature Tmax between these measuring points being 0.1° C. or less. From these facts, it has been found that the paint layer generates heat uniformly.

TABLE 2

|  |  | Paint No. 1 | No. 2 | No. 3 | No. 4 |
| --- | --- | --- | --- | --- | --- |
| DC12V | Tmax (°C.) | 121° C. | 218° C. | 342° C. | 402° C. |
| (3A) | t (sec) | 54 sec. | 55 sec. | 60 sec. | 62 sec. |
| DC50V | Tmax (°C.) | 120° C. | 218° C. | 343° C. | 403° C. |
| (3A) | t (sec) | 25 sec. | 30 sec. | 36 sec. | 40 sec. |
| DC100V | Tmax (°C.) | 122° C. | 220° C. | 341° C. | 403° C. |
| (3A) | t (sec) | 10 sec. | 15 sec. | 21 sec. | 18 sec. |

[EXPERIMENTAL EXAMPLE 2]

In the similar manner to the Experimental Example 1, composite mica plates were painted with pyrolytive paints 5 to 8 obtained by mixing and stirring a mixture of tungsten carbide, zirconium oxide, aluminum nitride, molybdenum boride, molybdenum disilicate and tungsten and a solvent containing sodium citrate, ethylene glycol, silicic acid anhydride and water and the paints on the mica plates were dried at 120° C.±6° C., resulting in paint layers having constituents shown in Table 3.

TABLE 3

| Constituent of paint | Paint No. 1 | No. 2 | No. 3 | No. 4 |
| --- | --- | --- | --- | --- |
| titanium carbide | 18 wt % | 26 wt % | 33 wt % | 42 wt % |
| zirconium oxide | 12 wt % | 13 wt % | 4 wt % | 3 wt % |
| aluminum nitride | 5 wt % | 3 wt % | 0.6 wt % | 0.7 wt % |
| molybdenum boride | 11 wt % | 14 wt % | 26 wt % | 16 wt % |
| molybdenum disilicate | 21 wt % | 13 wt % | 4 wt % | 3 wt % |
| tungsten | 14 wt % | 16 wt % | 20 wt % | 21 wt % |
| sodium citrate | 3 wt % | 3 wt % | 2 wt % | 2 wt % |
| ethylene glycol | 2 wt % | 2 wt % | 2 wt % | 2 wt % |
| silicic acid anhydride | 9 wt % | 7 wt % | 6 wt % | 8 wt % |
| water | remnant | remnant | remnant | remnant |

Maximum temperature Tmax (° C.) of the paint layers and current supply time t (sec) were measured in the similar manner to that in the Experimental Example 1. The result of the measurement is shown in Table 4.

TABLE 4

|  |  | Paint No. 5 | No. 6 | No. 7 | No. 8 |
| --- | --- | --- | --- | --- | --- |
| DC12V | Tmax (°C.) | 133° C. | 224° C. | 347° C. | 401° C. |
| (3A) | t (sec) | 58 sec. | 65 sec. | 58 sec. | 62 sec. |
| DC50V | Tmax (°C.) | 136° C. | 223° C. | 347° C. | 401° C. |
| (3A) | t (sec) | 32 sec. | 36 sec. | 41 sec. | 42 sec. |
| DC100V | Tmax (°C.) | 135° C. | 226° C. | 348° C. | 401° C. |
| (3A) | t (sec) | 15 sec. | 19 sec. | 20 sec. | 20 sec. |

The temperature increasing rate and the temperature distribution were similar to those in the Experimental Example 1.

Although details are omitted for simplicity of description, it has been found that pyrolytic paint for low and middle temperature range preferably contains metal carbide 15 to 30 wt % metal oxide 5 to 10 wt % metal nitride 3 to 5 wt % metal boride 10 to 15 wt % metal silicide 10 to 25 wt %, additive metal 10 to 20 wt %, sodium citrate 2 to 3 wt % ethylene glycol 2 to 2.5 wt % and silicic acid anhydride and/or sodium silicate 5 to 10 wt %. Further, it has been found that pyrolytic paint for high temperature ranges preferably contain metal carbide 25 to 45 wt %, metal oxide 3 to 5 wt %, metal nitride 0.5 to 1 wt %, metal boride 15 to 30 wt %, metal silicide 0.5 to 10 wt %, additive metal 15 to 25 wt % sodium citrate 2 to 3 wt %, ethylene glycol 2 to 2.5 wt % and silicic acid anhydride and/or sodium silicate 5 to 10 wt %.

Other metal carbide than those mentioned in the Experimental Examples 1 and 2 may include boron carbide, chromium carbide, etc. Similarly, other metal oxide may include cerium oxide, aluminum oxide, etc., and other metal boride may include titanium boride, etc. Further, it should be noted that the present invention is not limited to the metal mixture of single metal carbide, single metal oxide, single metal nitride and single metal boride. That is, a plural kinds of metal carbide, etc., may be included in the mixture.

[EXPERIMENTAL EXAMPLE 3]

On the paint layer of any of the pyrolytic paints of the Experimental Examples 1 and 2, a reinforcing coating of perhydropolysilazane is formed by painting and the coating was dried at 120° C.±6° C. so that the latter is heat cured at relatively low temperature. It is preferable in order to prevent clacks from occurring after the drying step that the silicon dioxide ceramic coating of perhydropolysilazane is painted on the paint layer to a thickness of in the order of 3 µm.

The paint layer strength, the thermal stability, the electric insulation and the chemical resistance of the paint layer having the reinforcing coating were measured and summarized below:

Strength of Paint layer: Pencil Hardness 9H (MV Hardness 600)

Thermal Stability: Maximum Durable Temperature 1200° C.

Heat Cycle: Durable in −40° C. to 400° C.
Electric Insulation: $10^{10} \Omega$/square cm
Chemical Resistance: 1000 Å/min.
(Conc.: hydrofluolic acid 1+nitric acid 99)

As described, the pyrolytic paint according to the present invention can generate heat enough to make a temperature of the paint as high as 400° C. or more which is about 4 or more times the maximum temperature achievable by known pyrolytic paints, with superior temperature rising characteristics. Further, the heat generation in the present pyrolytic paint layer is uniform throughout the surface of the paint layer.

Further, since the silicon dioxide component adheres to a painting surface while forming the lands, it is possible to form a paint layer strongly adhered to a surface of a substrate which may be of ceramics, metal, wood or paper. Since, therefore, it is possible to reliably paint a flat and smooth surface. Further, since the present pyrolytic paint is a water-soluble, inorganic paint, any substrate surface can be painted by any of the printing means such as gravure printing or screen printing, etc., and painting means such as brush painting, spray painting or immersion painting, etc., even if the substrate surface has a three-dimensional configuration. Further, there is no generation of undesired gas in the drying step after the painting and thus there is no environmental pollution problem.

In the pyrolytic paint according to the present invention, electric power supplied thereto is not lost as optical energy and heat generation from the ceramics component is performed by radiation of far-infrared ray. Thus, substantially the whole electric power supplied can be converted into thermal energy which can be derived very efficiently.

In addition, by forming the reinforcing layer on the paint layer, the mechanical strength, the thermal stability, the electric insulation and the chemical resistance of the paint layer can be improved remarkably.

We claim:

1. A water soluble pyrolytic paint, comprising the following components (a) and (b) in admixture:
   (a) a mixture that contains:
      (1) at least one metal carbide with the metal carbide(s) being present in the mixture in a total amount of 15 to 45 weight %,
      (2) at least one metal nitride with the metal nitride(s) being present in the mixture in a total amount of 0.5 to 5 weight %,
      (3) at least one metal oxide with the metal oxide(s) being present in the mixture in a total amount of 3 to 10 weight %,
      (4) at least one metal boride with the metal boride(s) being present in the mixture in a total amount of 10 to 30 weight %,
      (5) at least one metal silicide with the metal silicide(s) being present in the mixture in a total amount of 0.5 to 25 weight %,
      (6) at least one additive metal selected from the group consisting of tungsten and nickel, with the additive metal(s) being present in the mixture in a total amount of 10 to 25 weight %; and
   (b) a solvent that contains:
      (1) sodium citrate in amount of 2 to 3 weight %,
      (2) ethylene glycol in an amount of 2 to 2.5 weight %,
      (3) silicic acid anhydride, sodium silicate or a mixture thereof, in a total amount of 5 to 10 weight %, and
      (4) water.

2. A coated substrate wherein the coating is formed from a water soluble pyrolytic paint which forms a pyrolytic paint layer on said substrate when dried, said layer comprising the following ingredients:
   (1) at least one metal carbide, with the metal carbide(s) being present in the pyrolytic paint layer in a total amount of 15 to 45 weight %,
   (2) at least one metal nitride, with the metal nitride(s) being present in the pyrolytic paint layer in a total amount of 0.5 to 5 weight %,
   (3) at least one metal oxide, with the metal oxide(s) being present in the pyrolytic paint layer in a total amount of 3 to 10 weight %,
   (4) at least one metal boride, with the metal boride(s) being present in the pyrolytic paint layer in a total amount of 10 to 30 weight %,
   (5) at least one metal silicide, with the metal silicide(s) being present in the pyrolytic paint layer in a total amount of 0.5 to 25 weight %,
   (6) at least one additive metal selected from the group consisting of tungsten and nickel, with the additive metal(s) being present in the pyrolytic paint layer in a total amount of 10 to 25 weight %;
   (7) sodium citrate in amount of 2 to 3 weight %,
   (8) ethylene glycol in an amount of 2 to 2.5 weight %, and
   (9) silicic acid anhydride, sodium silicate or mixture thereof, in a total amount of 5 to 10 weight %.

3. A coated substrate wherein the coating is formed from a water soluble pyrolytic paint which forms a pyrolytic paint layer on said substrate when dried, said layer comprising the following ingredients:
   (1) at least one metal carbide, with the metal carbide(s) being present in the pyrolytic paint layer in a total amount of 15 to 30 weight %,
   (2) at least one metal nitride, with the metal nitride(s) being present in the pyrolytic paint layer in a total amount of 3 to 5 weight %,
   (3) at least one metal oxide, with the metal oxide(s) being present in the pyrolytic paint layer in a total amount of 5 to 10 weight %,
   (4) at least one metal boride, with the metal boride(s) being present in the pyrolytic paint layer in a total amount of 10 to 15 weight %,
   (5) at least one metal silicide, with the metal silicide(s) being present in the pyrolytic paint layer in a total amount of 10 to 25 weight %,
   (6) at least one additive metal selected from the group consisting of tungsten and nickel, with the additive metal(s) being present in the mixture in a total amount of 10 to 20 weight %,
   (7) sodium citrate in amount of 2 to 3 weight %,
   (8) ethylene glycol in an amount of 2 to 2.5 weight %, and
   (9) silicic acid anhydride, sodium silicate or mixture thereof, in a total amount of 5 to 10 weight %.

4. A coated substrate wherein the coating is formed from a water soluble pyrolytic paint which forms a pyrolytic paint layer on said substrate when dried, said layer comprising the following ingredients:

(1) at least one metal carbide, with the metal carbide(s) being present in the pyrolytic paint layer in a total amount of 25 to 45 weight %, (2) at least one metal nitride, with the metal nitride(s) being present in the pyrolytic layer in a total amount of 0.5 to 1 weight %, (3) at least one metal oxide, with the metal oxide(s) being present in the pyrolytic paint layer in a total amount of 3 to 5 weight %, (4) at least one metal boride with the metal boride(s) being present in the pyrolytic paint layer in a total amount of 15 to 30 weight %, (5) at least one metal silicide, with the metal silicide(s) being present in the pyrolytic paint layer in a total amount of 0.5 to 10 weight %, (6) at least one additive metal selected from the group consisting of tungsten and nickel, with the additive metal(s) being present in the pyrolytic paint layer in a total amount of 15 to 25 weight %, (7) sodium citrate in amount of 2 to 3 weight %, (8) ethylene glycol in an amount of 2 to 2.5 weight %, and (9) silicic acid anhydride, sodium silicate or mixture thereof, in a total amount of 5 to 10 weight %.

5. A water soluble pyrolytic paint as recited in claim 1 wherein:

(1) said at least one metal carbide is titanium carbide, (2) said at least one metal oxide is selected from the group consisting of titanium oxide, zirconium oxide and cerium oxide, (3) said at least one metal nitride is aluminum nitride, (4) said at least one metal boride is selected from the group consisting of chromium boride, molybdenum boride, vanadium boride and titanium boride, and (5) said at least one metal silicide is molybdenum disilicide.

6. A coated substrate as recited in claim 2, wherein the pyrolytic paint layer is painted with a perhydropolysilazane paint.

7. A coated substrate as recited in claim 3, wherein the pyrolytic paint layer is painted with a perhydropolysilazane paint.

8. A coated substrate as recited in claim 4, wherein the pyrolytic paint layer is painted with a perhydropolysilazane paint.

* * * * *